United States Patent [19]
Tew

[11] Patent Number: 6,121,613
[45] Date of Patent: Sep. 19, 2000

[54] FORWARD LOOKING INFRARED DEVICE

[75] Inventor: Claude E. Tew, Dallas, Tex.

[73] Assignee: Raytheon Company, Lexington, Mass.

[21] Appl. No.: 06/507,628

[22] Filed: Jun. 24, 1983

[51] Int. Cl.[7] .................................................. G02B 26/10
[52] U.S. Cl. .......................................... 250/334; 250/352
[58] Field of Search .............................. 357/30; 250/332, 250/334, 357, 252.1, 352

[56] References Cited

U.S. PATENT DOCUMENTS

| | | | |
|---|---|---|---|
| 4,080,532 | 3/1978 | Hopper | 250/332 |
| 4,495,416 | 1/1985 | Mason et al. | 250/342 |

OTHER PUBLICATIONS

Ferguson et al, "FLIR Systems Today" Proceedings of SPIE, Technical paper, vol. 79, (1976) pp. 138–145.

Milton, Focal Plane design for IR Imaging Systems, Conference, Eascon 1976, Washington D.C., Sep. 1976, pp. 18A–18D.

*Primary Examiner*—Ian J. Lobo
*Attorney, Agent, or Firm*—Baker Botts L.L.P.

[57] ABSTRACT

A forward looking infrared (FLIR) device implemented using complementary metal oxide semiconductor (CMOS) techniques is disclosed. The device includes optics (10) for focusing infrared energy onto a scanner (12) for scanning across a detector array 16; a signal conditioning integrated circuit 18 for producing television compatible video signals from the detector array outputs which are electrical signals representative of the infrared energy impinging thereon; and a monitor (2) for displaying the video signals. The detector array and signal conditioning IC are mounted on a metallized ceramic chip affixed within a DEWAR (19). Electronics (20) ancillary to the signal conditioning IC is located outside the DEWAR. The signal conditioning IC includes an array of preamplifiers (24) d-c coupled to the detector array for amplifying the detector array outputs, a-c coupled into band limiters (26) for limiting noise, an array of circuits (28) including d-c restoration circuits for restoring the d-c level to the a-c signals, offset circuits for partially correcting the d-c restored signals for MOSFET losses and a multiplexer. The multiplexer multiplexes the partially corrected signals as video signals to a multiplexer post amplifier 36A. The multiplexer post amplifier output goes to a multiplying digital to analog converter (MDAC) 30. The MDAC completes correcting the video signals for offset, and corrects the gain thereof for post amplification in a post amplifier 36 to provide 525 line video for television display.

13 Claims, 9 Drawing Sheets

FORWARD LOOKING INFRARED DEVICE

BACKGROUND OF THE INVENTION

This invention relates to electro-optics and more particularly to a forward looking infrared (FLIR) device.

In the past FLIR devices have had applications limited by size, weight, and cost constraints. The size has been determined by an infrared energy focusing optics, scanner, and the detector array required for converting infrared energy emanating from a scene into electrical signals representative of the scene; the cooler (refrigerator or DEWAR) for cooling the detector array to its operating temperature; and the preamplifiers and post amplifiers for driving either a scanned light emitting diode (LED) array that is viewed by a television (TV) camera or digital circuits or digitally manipulating the signals to form TV compatable single line video. Many of these components including the number thereof make the system bulky and heavy. Also because of the component size, the component connections complicate the structure and its fabrication; e.g., the detector array is mounted in a vacuum module mounted on the end of a refrigerator's cold finger and over a hundred leads must pass through the vacuum module for connection to the array of preamplifiers while maintaining a vacuum in the vacuum module. Further, the required power supply for the required electronics contibutes substantially to the weight and size of the FLIR device. All these factors detrimentally contribute to the reliability, efficiency, size, weight and cost of the system of which the size, weight and cost all but preclude use in manportable systems and small aircraft.

SUMMARY OF THE INVENTION

The present invention resulted from a discovery made during an effort to improve the size and weight of the array of preamplifiers through the utilization of an array of switching preamplifiers in an integrated circuit. To reduce size CMOS techniques were being used to fabricate the switching amplifiers when it was found that although switching amplifiers were not the answer to the size limitations, their p-channel 1/f noise measurements indicated that CMOS techniques would provide simple single ended Class A amplifiers that would approach the noise level advantage provided by the more complicated switching preamplifiers. This discovery led to the use of CMOS techniques to produce the signal conditioning integrated circuit necessary for FLIR systems suitable for manportable applications and small aircraft use.

Accordingly it is an object of this invention to provide a compact, lightweight FLIR system suitable for manportable applications and use in small aircrafts.

Another object of this invention is to provide an inexpensive FLIR system which lends itself to the mass-production of large quantities.

Still another object of the invention is to provide a FLIR system having a reduced number of components.

Yet another object of the invention is to provide a FLIR system having reduced power consumption requirements for operation.

Briefly stated, the FLIR system of this invention comprises a FLIR device having: a scanner for scanning a scene emanating infrared (IR) energy, an IR reference source, an IR focusing means for focusing the scanned IR energy and reference source onto an array of IR detectors for producing electrical signals representative of the IR energy impinging thereon; a cooler means for cooling the array of detectors to its operating temperature; a signal conditioning integrated circuit (IC) operatively connected to the IR detector array and affixed, together with the detector array, within a vacuum module of the cooler means; an electronics package ancillary to the components of the IC; and a monitor for displaying the IR scene. The signal conditioning integrated circuit includes an array of preamplifiers electrically connected to the array of detectors, an array of noise band limiters electrically connected to an array of d-c restoration circuits, an array of offset correction circuits, a multiplexer, multiplexer logic, a first stage post amplifier, a multiplying digital to analog converter (MDAC) and a second stage post amplifier fabricated using CMOS techniques to provide an IC which together with the IR detector array can be affixed to the chip mount of the vacuum module presently occupied by the detector array alone.

These and other objects and features of the invention will become more readily understood in the following detailed descriptions of the invention taken in conjunction with the drawings in which:

DETAILED DESCRIPTION OF THE EMBODIMENTS

Figure 1:
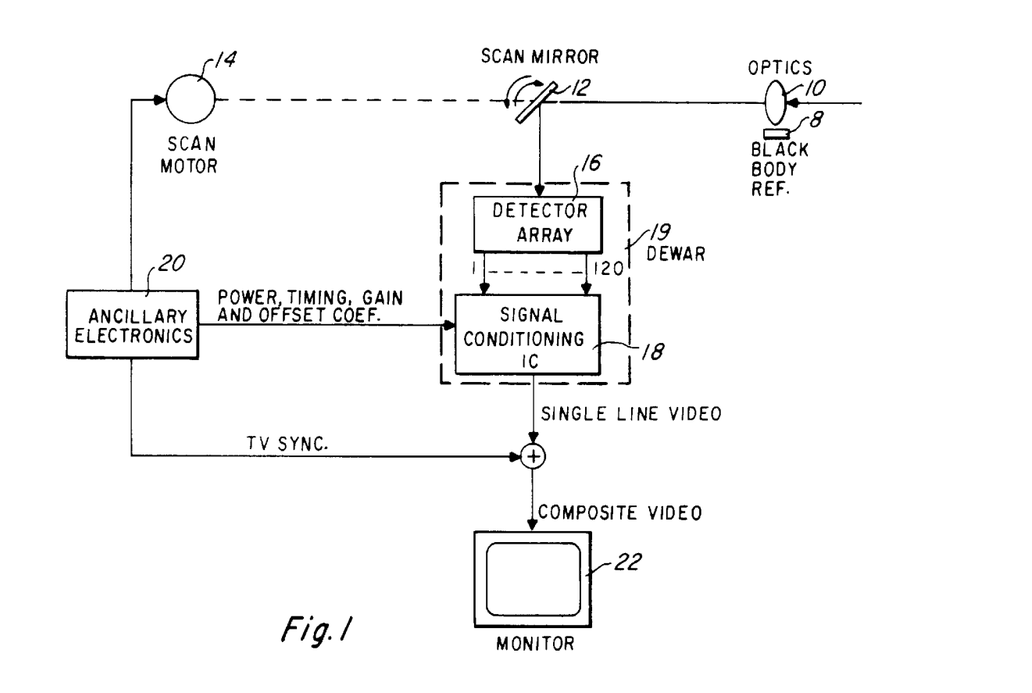
FIG. 1 is a block diagram of the FLIR system constituting the invention.

Referring now to FIG. 1, the Forward Looking Infrared System comprises an infrared reference source (black body) 8, a focusing lens system 10 for focusing infrared energy emanating from a scene onto a scanning mirror 12. The scanning mirror 12 is vibrated by scan motor 14. The vibrating scanner 12 reflects the infrared energy and reference source in a scanning motion across a detector array 16. The detector array 16 maybe, for example, a one hundred forty element linear array of photoconductors of which only one hundred twenty elements are used. Each element of the array produces an electrical signal representative of the infrared energy impinging thereon.

The electrical signals of the detector array 16 are connected to a signal conditioning integrated circuit (IC) 18 which outputs single line video. The detector array 16 and signal conditioning IC 18 are mounted on a metallized ceramic substrate (not shown) affixed to a chip mounting area of DEWAR 19, or to the end of a refrigerators cold finger (not shown). As the area available in the DEWAR is limited, the ancillary electronics 20 for the signal conditioning IC is located outside the DEWAR. The ancillary electronics 20 provides power to the scan motor 14; power, timing and gain and offset coefficients to the signal conditioning IC 18, and a television (TV) synchronization signal to the single line video output of the signal conditioning IC 18 to provide a composite video to a television monitor 22.

Figure 2:
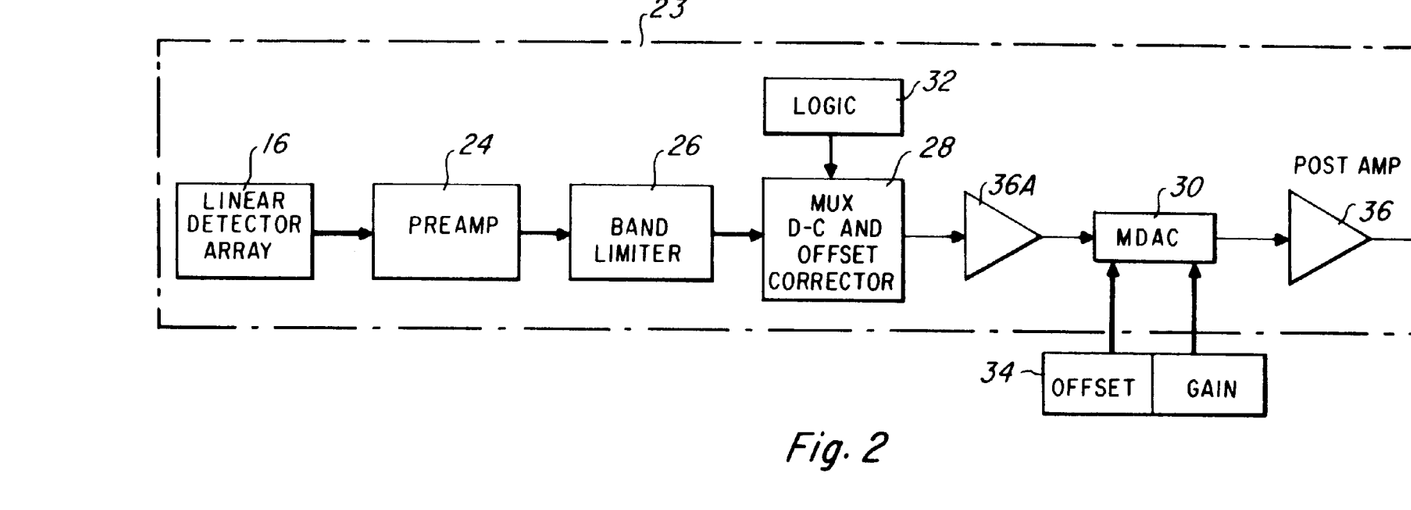
FIG. 2 is a block diagram of the detector array and components of the signal conditioning integrated circuit mounted on the cooler means.

Referring now to FIG. 2, a substrate 23 which is, for example, a ceramic substrate affixed to the DEWAR 19 (FIG. 1) includes the linear detector array 16 (FIG. 2). The detector array is, for example, a one hundred twenty active element mercury, cadmium, tellurium (Hg, Cd, Te) detector array. Each detector element is connected, for example, by wire leads to a preamplifier of an array of one hundred twenty preamplifiers 24. The amplified outputs of the array of preamplifiers 24 are noise band limited by a corresponding number of band limiters in an array of band limiters 26; d-c restored, corrected for threshold voltage offsets and multiplexed by an offset corrector multiplexer 28 to a first stage (multiplexer) post amplifier 36A. The MUX post amplifier's output drives a multiplying digital to analog converter (MDAC) 30. Multiplexing signals are provided to the multiplexer 28 by logic circuitry 32; while 8-bit offset correction words and 8-bit gain normalization words are provided the MDAC by a memory 34 located in the ancillary electronics. The output of the MDAC is to a post second stage amplifier 36 for amplification to a monitor working level. The preamplifier array 24, band limiter array 26, d-c restoration circuit and offset corrector circuit array and multiplexer 28, MDAC 30, multiplexer (MUX) logic 32, and post amplifier 36 all together form, for example, an integrated circuit fabricated using complementary metal oxide semiconductor (CMOS) technology.

Figure 3A:
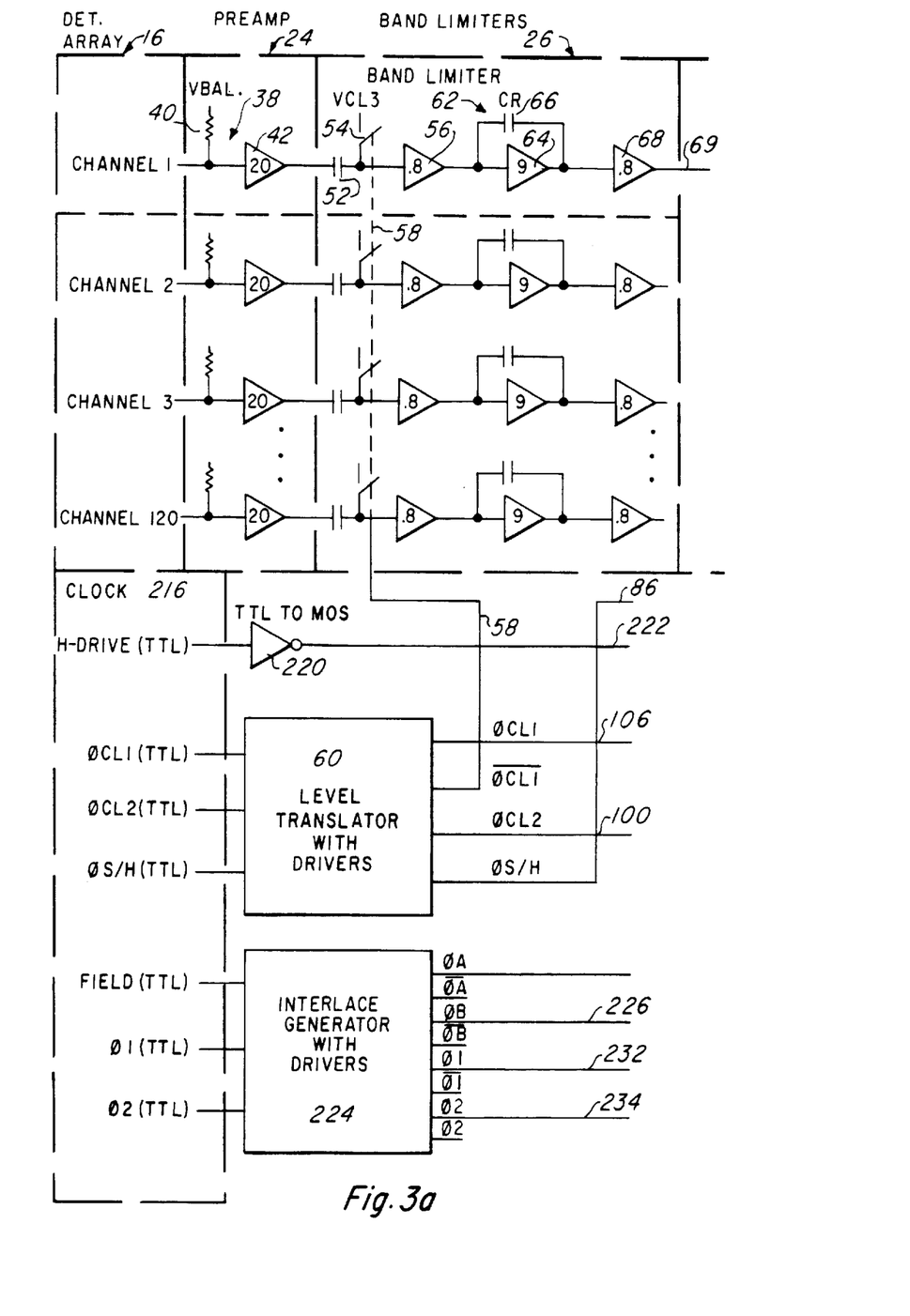
FIGS. 3a–3c constitute a schematic diagram partly in block form of the signal conditioning integrated circuit of the FLIR system.
Figure 3B:
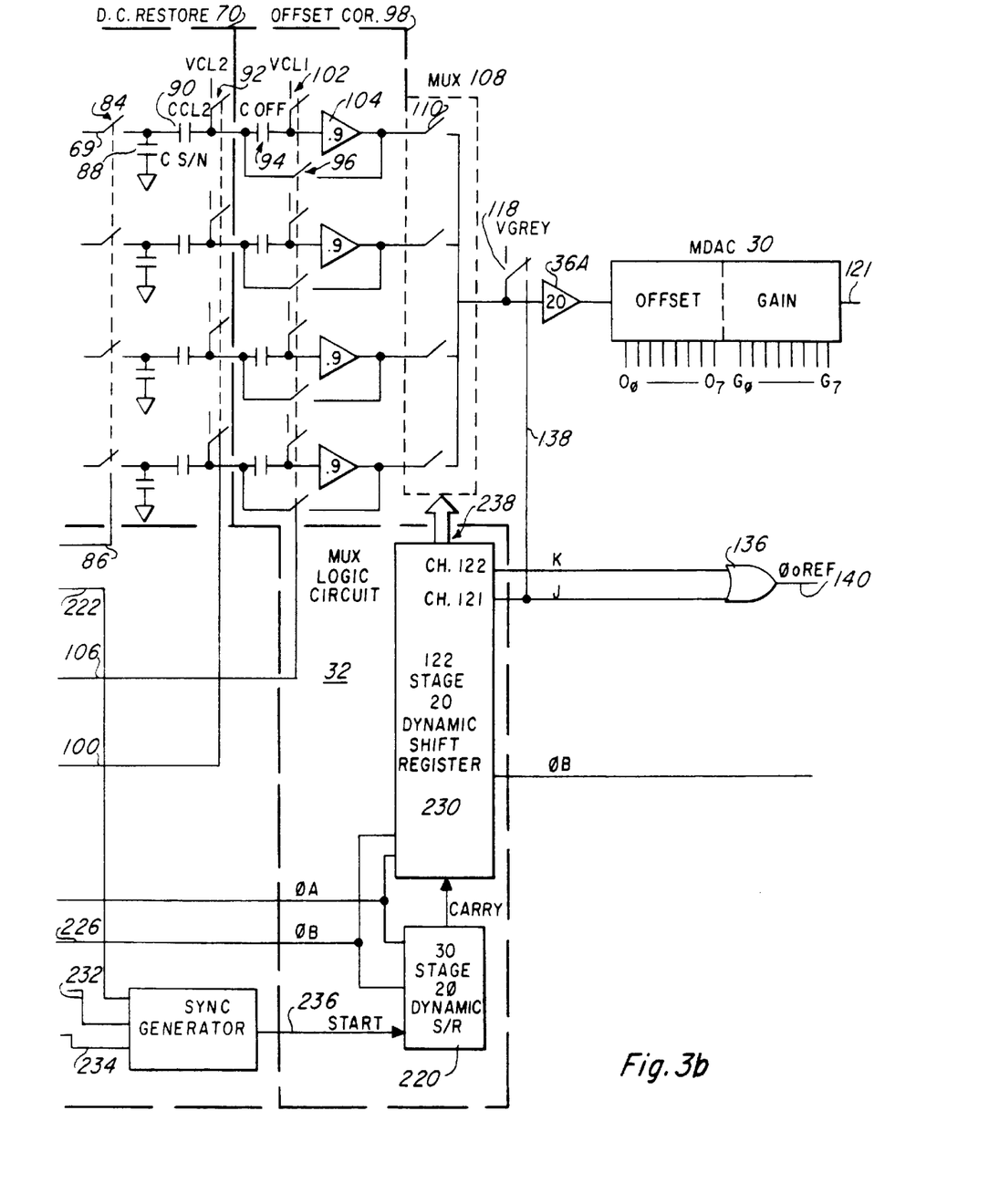
Figure 3C:
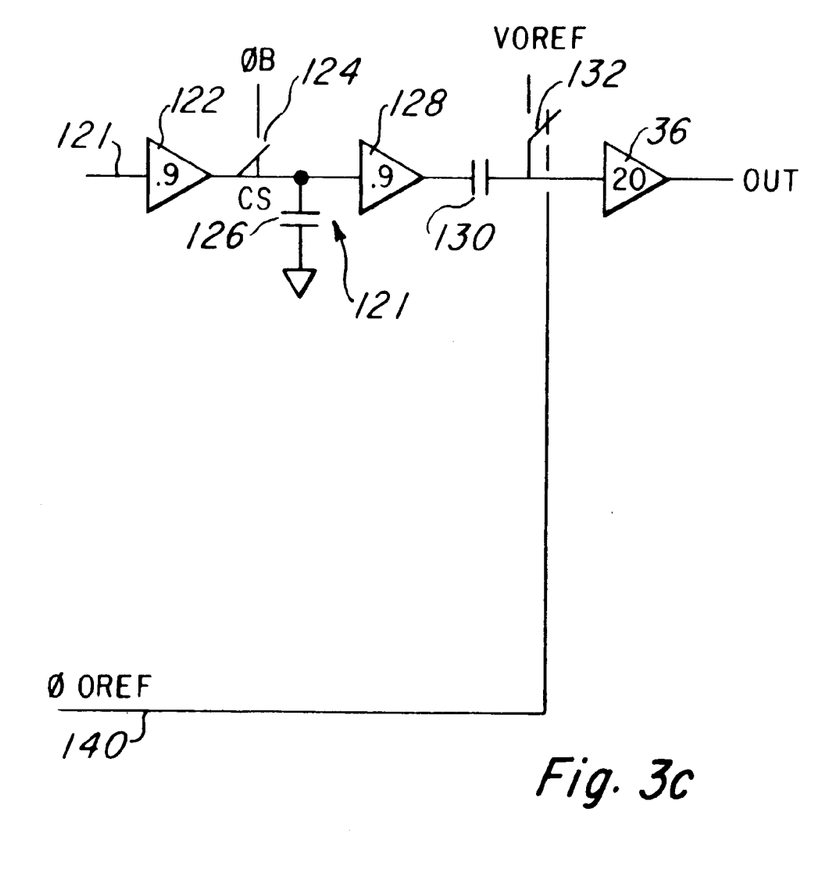

Referring now to FIGS. 3a–3c for a more detailed description of the signal conditioning integrated circuit 18 and the ancillary electronics 20, the one hundred twenty detector channels (channels 1 . . . 120) are connected to the corresponding array of preamplifiers 24. (FIG. 3a) The preamplifiers are metal oxide semiconductor (MOS) amplifiers.

PREAMPLIFIERS

As all of the preamplifiers are identical only one need be described. The preamplifier 38 includes a bias resistor 40 having a first end connected to a Vballast source (not shown) and a second end connected to the junction of the channel 1 detector element output and the input terminal of amplifier 42. Amplifier 42 has a gain of-20 as indicated in the drawing.

Figure 4:
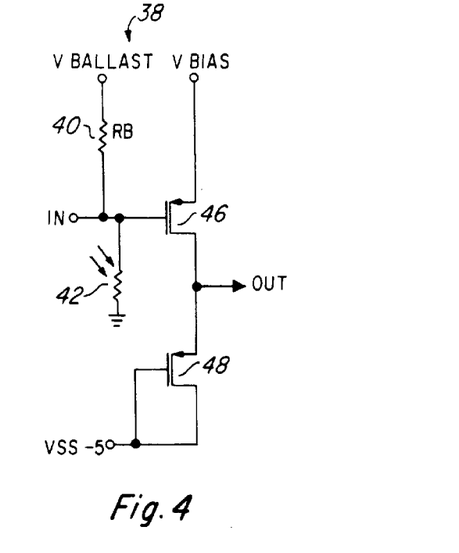
FIG. 4 is a schematic diagram of a preamplifier of the array of preamplifiers implemented in CMOS.

A MOS preamplifier is shown in FIG. 4 and includes the bias resistor 40 and a detector 42 connected together with the channel 1 detector element output to the gate of field effect transistor (FET) 46. FET 46 has its source connected to VBIAS and its drain connected to the junction of the output and source of load FET 48.

BAND LIMITERS

The outputs of the array of preamplifiers 24 (FIG. 3a) are connected to the corresponding array of band limiters 26. As all the band limiters are identical only band limiter 50 need be described. The band limiter 50 for channel 1 includes a capacitor 52 having a first plate connected to the output of preamplifier 38 and a second plate connected to the junction of a first terminal of a switch 54 and input of a first stage amplifier 56. Amplifier 56 has a gain of about 0.8 as indicated in the drawing. The switch 54 has a second terminal connected to a clamping voltage source VCL3 (not shown) its pole connected by lead 58 to a first output terminal (0CL1) of a level translator with drivers 60.

The output of first stage amplifier 56 is connected to a second stage frequency dependent, negative feedback amplifier circuit 62 having an amplifier 64 with a gain of about-9 and a frequency dependent feedback capacitor 66. This stage is a Miller integrator. The output impedance of 56 and the Miller effect multiplied CR 60 sets the dominant pole of the band limiter. The output of the second stage amplifier 62 is connected to the third stage amplifier 68 which has a gain of about 0.8. The output of the third stage amplifier 68 is connected by lead 69 to a d-c restore circuit 70 (FIG. 3b).

Figure 5:
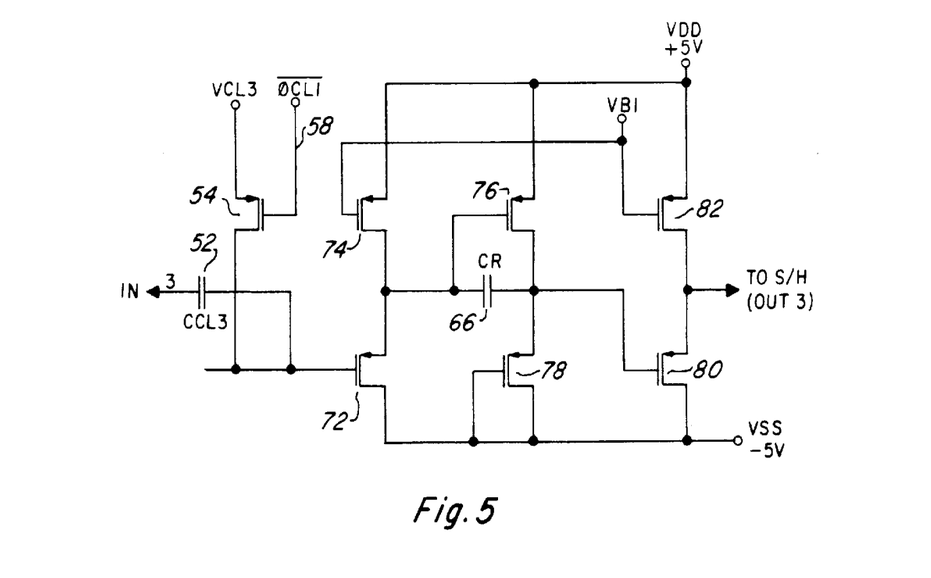
FIG. 5 is a schematic diagram of the band limiter of the FLIR system implemented in CMOS.

FIG. 5 describes a band limiter implemented in MOS. The capacitor 52 is shown with its second plate connected to the junction of the drain of the MOSFET switch 54 and gate of first MOSFET 72 of the first stage source follower amplifier 56. The source of FET switch 54 is connected to the voltage source VCL3 (not shown) and the gate is connected by lead 58 to the 0CLI terminal. While the source of MOSFET 72 is connected to the junction of the drain of the source follower amplifier's MOSFET 74 and gate of MOSFET 76 of the second stage inverting amplifier 64 and first plate of capacitor 66. The source of MOSFET 74 is connectedto a +5 VDD source and its gate connected a VB1 source of power (not shown). The drain of MOSFET 72 is connected to –5 VSS power source (not shown). The source of MOSFET 76 is connected to the +5V VDD and the drain is connected to the junction of the second plate of capacitor 66, source of load MOSFET 78, and gate of MOSFET 80 of the third stage source follower amplifier 68.

MOSFET 80 of the third stage amplifier 68 has its drain connected to the –5V VSS power source and its source connected to the junction of its output to the d-c restore circuit 70 and drain of MOSFET 82. MOSFET 82 has its drain and gate connected, respectively, to the VB1 source of power and the +5V VDD source of power.

DC RESTORE CIRCUIT

The d-c component restore circuits 70 (FIG. 3b) each include a switch 84 having a first terminal connected to the output of the third stage amplifier 68 (FIG. 3a). The switch 84 (FIG. 3b) is controlled by the 0SH output of the level translator with drivers 60 (FIG. 3a) which is connected by lead 86 to the switch 84. A second terminal of switch 84 (FIG. 3a) is connected to the junction of sample and hold capacitor 88 to ground and of clamping capacitor 90. The clamping capacitor 90 is connected to the junction of a first terminal of voltage clamp (VCL2) switch 92, and to an offset capacitor 94 and a first terminal of a switch 96 of an analog offset correction circuit 98. Switch 92 has a second terminal connected to voltage (VCL2) source. The switch is connected by lead 100 to the 0CL2 terminal of level translator withdrivers 60 whose 0CL2 controls the action of the switch. This DC restore circuit serves two functions. Firstly, it acts as a correlated double sampler upon the $$\sqrt{\frac{KT}{CCL3}}$$

noise generated by the switch 54 (FIG. 3a) and capacitor 52. Secondly, it d-c restores the video to the IR scene present during the d-c restore time.

ANALOG OFFSET CORRECTOR CIRCUITS

The offset capacitor 94 of the analog offset correction circuit 98 is connected to the junction of a first terminal of switch 102 and an amplifier 104. Amplifier 104 has a gain of 0.9. Switch 102 has a second terminal connected to a clamping voltage (VCL1) not shown. Switch 102 and switch 96 are connected by lead 106 to the ØCL1 terminal of level translator with drivers circuit 60 (FIG. 3a). The ØCL1 signals control the operation of the switches 102 (FIG. 3b) and 96. A second terminal of switch 96 is connected to the junction of the output terminal of amplifier 104 and multiplexer 108. The resulting signal at the output of amplifier 104 is offset compensated and typically results in a 10:1 decrease in channel to channel offsets.

MULTIPLEXER

The multiplexer 108 (FIG. 3b) comprises a plurality of switches 110 one for each channel. The multiplex switches are controlled by the logic circuitry 32.

MOS IMPLEMENTATION OF THE d-c RESTORE, OFFSET CORRECTION AND MULTIPLEXER

Figure 6:
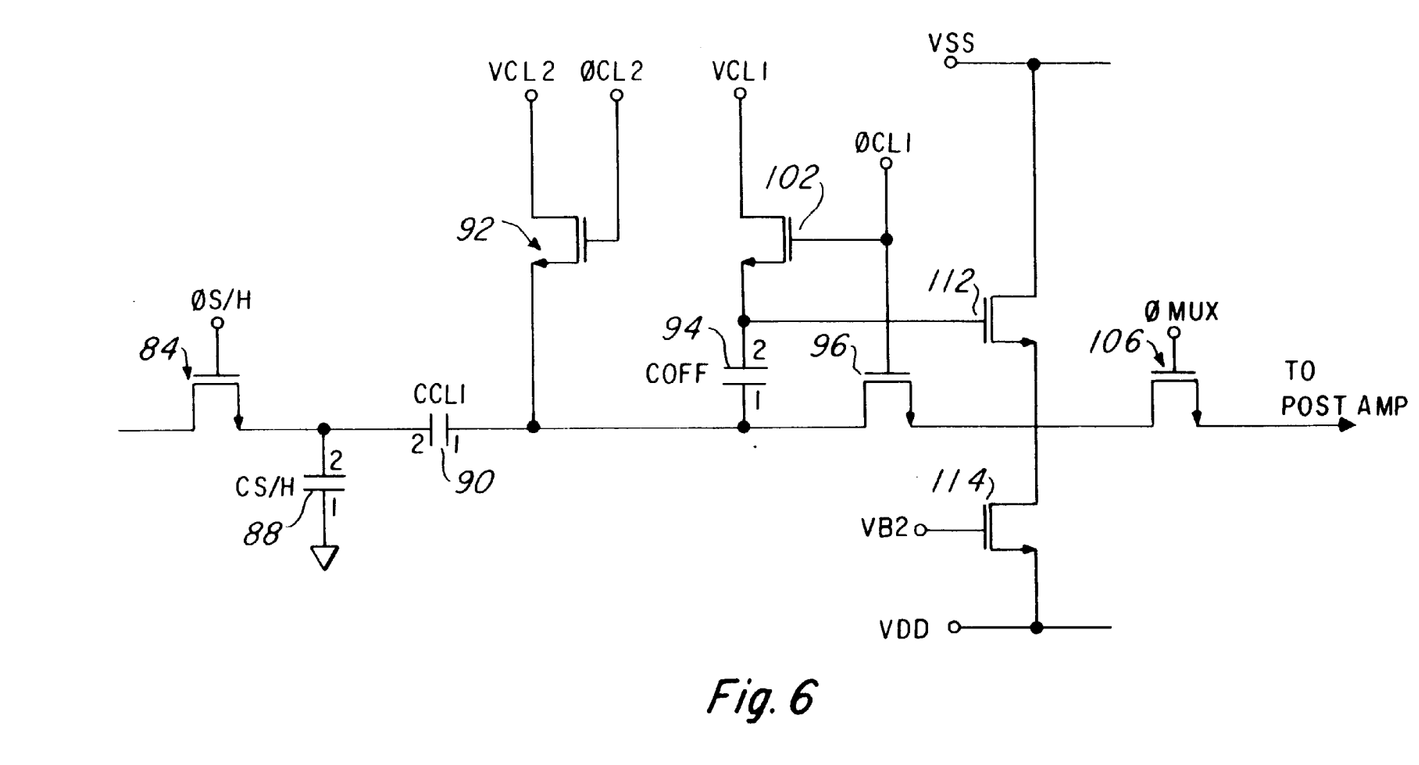
FIG. 6 is a schematic diagram of a d-c restore circuit, offset correction circuit and multiplexer of the multiplexer d-c restore and offset correction circuits implemented in CMOS.

The d-c restore circuit 70 (FIG. 3b), analog offset correction circuit 98 and the multiplexer 108 for each channel is disclosed in an MOS configuration in FIG. 6. As the detector outputs are a-c coupled through capacitor 52 (FIG. 3a) of the and limiter 26 it is necessary to restore the d-c level to prevent streaking in the scene of the display. With the application of a phase sample and hold (ØSH) signal, MOSFET switch 84 (FIG. 6) is closed to charge sample and hold capacitor 88 and capacitor clamp 1 (CCL1) to the level of the incoming signal. Then MOSFET switch 92 is activated by a phase clamp 2 (ØCL2) signal to add a clamping voltage (VCL2) to the clamping capacitor 90 to restore the d-c component to the incoming a-c signals. ØCL2 is activated when the scan mirror/optics are allowing the detector to subtend the reference source 8 (FIG. 1).

The analog offset correction circuit 98 (FIG. 3b) includes the capacitor (CL1) 90 (FIG. 6) the MOSFET switch 92 which has its drain connected to clamping voltage (VCL2), gate connected to clamp 2 phase (ØCL2) and source connected to the junction of capacitor 90, first plate of offset capacitor (COFF) 94 and drain of MOSFET switch 96. The second plate of capacitor 94 is connected to the junction of the source and gate, respectively, of MOSFETS 102 and 112. MOSFET switches 102 and 96 have their gates connected to the phase 1 clamping (ØCL1) signals. The drain of MOSFET switch 102 is connected to a voltage (VCL1) source.

The MOSFET 112, which together with load MOSFET 114 forms amplifier 104 of FIG. 3b, has its drain connected to a VDD voltage and it source connected to the junction of the source MOSFET switch 96 and drain of MOSFET 114 and to the drain of MOSFET 116 of the analog switch multiplexing device. The source and gate of MOSFET 114 are connected, respectively, to a VSS voltage and VB2 voltage.

The capacitors (COFF) 94 and (CCL1) 90 are used to subtract out offset voltages associated with threshold variations in the transistor 112. During the vertical scan retrace the phase one clamping signal (ØCL1) is applied to MOSFET switches 102 and 96 and voltage (VCL1) is applied to the gate of MOSFET 112, offset capacitor 94 and drain of MOSFET switch 96 whereby the threshold voltage (voltage drop from the gate to the source of MOSFET 112) is stored on the offset capacitor 94. Then when the system returns to active video time, the amplified input (video) signals pass through the offset capacitor 94 to add the nominal offset voltage to the video signal. Thus, after passing through the source follower MOSFET 112, the resulting signal at the output of amplifier 104 is, as previously stated, offset compensated and typically results in a 10:1 decrease in channel to channel offsets. This output voltage is applied to the multiplexing switch 110.

GRAY LEVEL, FIRST STAGE POST AMPLIFIER, S&H, VoREF AND SECOND STAGE POST AMPLIFIER

With the application of the multiplexer phase signals to the gate of MOSFET 110 (FIG. 3b) the channel 1 through channel 120 input (video) signals are multiplexed using time division multiplexing to the junction of a first terminal of switch 118 and to the first stage post amplifier 36A. A second terminal of switch 118 is connected to voltage (VGRAY) for setting the gray level of the video during video deadtime. Switch 118 is controlled by a logic signal (J) generated by logic circuitry 32 connected by lead 138 to MOSFET switch 118. The output of the first stage post amplifier 36A is connected to the multiplying digital to analog converter (MDAC) 30 (hereinafter described).

The output of MDAC 30 is connected by lead 121 to an amplifier 122 (FIG. 3c) for signal level restoration. The output of amplifier 121 is connected to a first terminal of switch 124. A second terminal of switch 124 is connected to the junction of sample and hold circuit capacitor 126 and amplifier 128. Switch 124 is controlled by phase logic signals (ØB) of logic circuitry 32 (FIG. 3b).

The output of amplifier 128 (FIG. 3c) is connected to a coupling capacitor 130. Coupling capacitor 130 is connected to the junction of a first terminal of switch 132 and second stage post amplifier 36. A second terminal of switch 132 is connected to reference voltage (VoRef). Switch 132 is controlled by a phase signal (ØoRef) generated by OR gate 136 from the J and K signals of the logic circuitry 32 (FIG. 36). The VoRef signal (FIG. 3c) is to provide a synchronized TV blanking level signal to amplifier 36. Amplifier 36 provides 525 line video signals compatible for TV display.

Figure 7A:
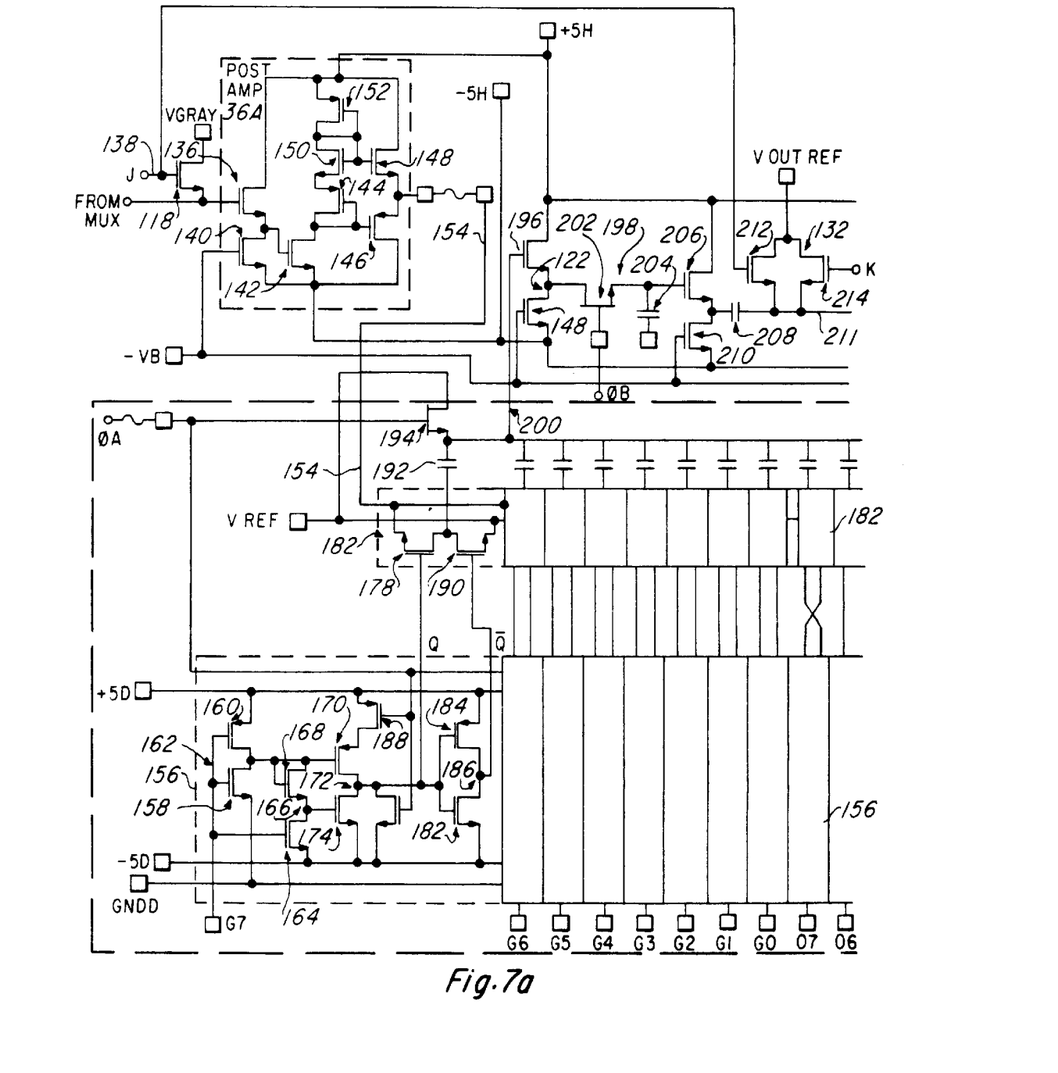
FIGS. 7a–7b constitute a schematic diagram partly in block form of the first stage post amplifier, multiplying digital to analog converter and post amplifying circuit implemented in CMOS.
Figure 7B:
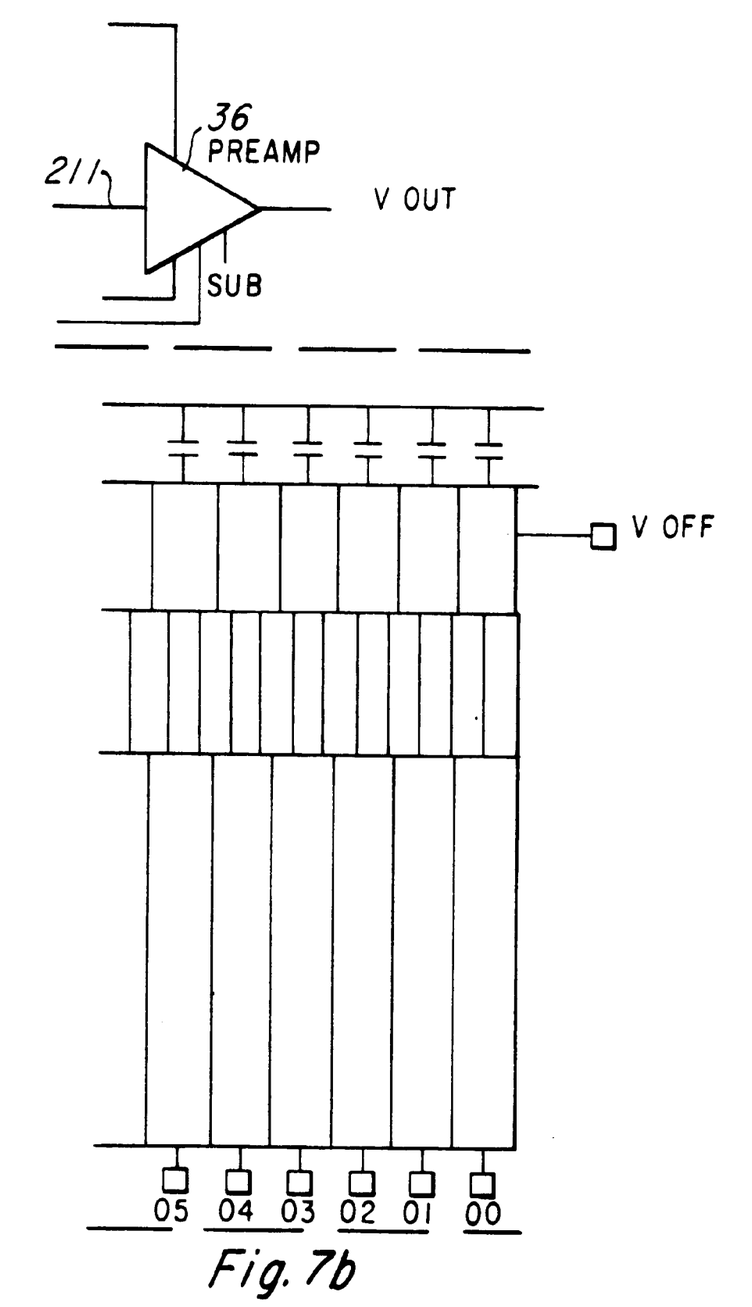

Referring now to FIGS. 7a & 7b for a MOS implementation of the TV gray voltage producing switch 118, first stage post amplifier 36A, multiplying digital to analog converter (MDAC) 30, sample and hold circuit 125 and second post amplifier 134.

GRAY VOLTAGE (MOS)

The gray voltage switch 118 (FIG. 7a) includes a MOSFET switch 118 having its drain connected to a gray producing voltage (VGRAY), its source connected to the junction of the output of multiplexer 108 (FIG. 3b) and gate of MOSFET 136 (FIG. 7a) of the first stage post amplifier 36A, and its gate connected by lead 138 to the "J" output of logic circuit 32 (FIGS. 2 and 3). During video horizontal deadtime the "J" output signal closes the MOSFET switch 118 to provide a gray producing voltage for framing the TV display.

FIRST STAGE POST AMPLIFIER (MOS)

The MOSFET 136 is connected to MOSFET 140 to form a source follower amplifier. The output of the source follower amplifier is connected to a MOSFET driver 142. Driver 142 is connected to the gate and drain of MOSFET 144 and gate of MOSFET 146. MOSFET 146 is connected to MOSFET 148 to form a complementary inverting amplifier. MOSFET 148 has its gate connected to the junction of the gates and drains of MOSFETS 150 and 152. The sources of MOSFETs 144 and 150 are connected together. In this arrangement the MOSFETS 144, 150 and 152 adjust the voltage levels connected to the complementary source follower amplifier MOSFETS 146 and 148. The output of the first stage post amplifier is connected to the V out terminal if an MDAC is not used, otherwise it is connected to the MDAC 30 switches 182.

MULTIPLYING DIGITAL TO ANALOG CONVERTER (MOS)

The high speed video data output of the multiplexer 108 has gain and offset abnormalities which destort the video. For display, the video is corrected by removing the gain and offset errors; for non displaying uses such as, for example, missile tracking the video need not be corrected. Thus, for corrected video signals, the output of the first stage post amplifier 36A is connected by lead 154 to the multiplying digital to analog converter (MDAC) 30. MDAC 30 uses switched capacitor techniques.

The gain and offset coefficients required to correct the video are determined for each of the one hundred twenty channels of the example using a test unit (not shown). These gain and offset coefficients are stored as data words (preferably 6 or 8 bit words) in a non-volatile memory, which may be a bipolar ROM, fast enough to supply the gain and offset coefficients to the video. Thus, the input to MDAC 30 is 16 bits of data, eight of which (G0–G7) control the gain and eight of which (Oo–O7) control the offset. The eight bit gain words and eight bit offset words of the bipolar ROM are transistor to transistor logic (T2L) levels (0V to +5V) and must be converted to MOSFET logic levels (-5V to +5V). Thus the bits of the gain word and offset word, respectively, are applied to terminals G7–G0 and O7–O0) (FIGS. 7a and 7b); each terminal is connected to a cell 156.

As the cells 156 are identical only one will be described in detail using for example the G7 terminal, the T2L signal for the eight bit is applied to the gates of MOSFETs 158 and 160 of inverter amplifier 162 and to the gate of MOSFET 164 of level shifting inverting amplifier 166. The sources of MOSFETS 158 and 160 are connected, respectively, to ground and to +5D and their drains are connected to the junction of the gate and drain of MOSFET 168 of amplifier 166 and gate of MOSFET 170 of inverter amplifier 172. The source of MOSFET 164 is connected to -5D and its drain is connected to the junction of the source of MOSFET 168 and the gate of MOSFET 174 of the inverter amplifier 172. The source and drain of MOSFET 174 are connected, respectively, to the -5D and junction of the drain of MOSFET 170, drain of a first switching MOSFET 176, gate of switching MOSFET 178 of the capacitor switch 180 and gates of MOSFETS 182 and 184 of inverter amplifier 186. The source of switching MOSFET 176 is connected to -5D and its gate is connected to the gate of a second switching MOSFET 188 and ØA (±5V) terminal. MOSFET 188 has its source connected to +5D and its drain connected to the source of MOSFET 170 of the inverter amplifier 172. Finally MOSFET 182 of inverter amplifier 186 has its source connected to +5D and its drain connected to the junction of the drain of MOSFET 184 of inverter amplifier 186 and gate of switching MOSFET 190 of capacitor switch 180. The source of MOSFET 184 of the inverter amplifier 186 is connected to the +5D source of power. The outputs of inverters 172 and 186 are, respectively, the Q and $\overline{Q}$ signals connected to analog switches 178 and 190.

Capacitor switch 180 comprises one cell 182 of sixteen cells 182. The sixteen cells 182 correspond to the cells 156. Cell 182 includes the MOSFETS 178 and 190 which form the capacitor switch 180. MOSFET 178 has its source connected by lead 154 to the output of the first stage post amplifier 120, and its drain connected to the junction of a first plate of a capacitor 192 and to drain of MOSFET 190. The source of MOSFET 190 is connected to a reference voltage (V Ref). The second plate of capacitor 192 is connected to the junction of the source of switching MOSFET 194, the second plates of the remaining capacitors 192 and of lead 200 to the gate of MOSFET 196 of amplifier 122 of S&H circuit 198. The gate and drain of MOSFET 194 are connected, respectively, to phase A (ØA) clock pulse terminal and V Ref. terminal.

SAMPLE AND HOLD FOR MDAC OUTPUTS 198 (MOS)

The sample and hold circuit includes the source follower amplifier 122 which has the MDAC output connected by lead 200 to the gate of MOSFET 196. The source of MOSFET 196 is connected to the junction of the drains of MOSFETS 148 and 202 and the drain of MOSFET 196 is connected to the plus voltage (+5) power source. While the source of MOSFET 148 is, as previously described, connected to -5H. MOSFET 202 is a switch whose gate is connected to phase B (ØB) signals of the logic electronics 32 and whose source is connected to the junction of a first plate of capacitor 204 and gate of MOSFET 206. The second plate of capacitor 204 is connected to ground. The drain of MOSFET 206 is connected to the +5V source and its source is connected to the first plate of a capacitor 208 and drain of MOSFET 210. MOSFET 210 has its gate connected to -VB and its source connected to the -5V source of power. The second plate of capacitor 208 is connected by lead 211 to the junction of the switch 132 and input terminal of the second stage post amplifier 36. The switch 134 includes two MOSFETS 212 and 214 which have their sources connected to the junction of the capacitor 208 and second stage post amplifier 36, their drains connected to the V out reference source and their gates connected, respectively, to the synchronization signals of the logic output J 138 and to the K output signals of logic circuit 32. The VoRef established the blanking level that separates video information from synchronizing information in the composite television video signals.

ANCILLARY ELECTRONICS

Returning now to FIGS. 1 and 3a, the ancillary electronics 20 (FIG. 1) which is outside the DEWAR and off the CMOS type chip bearing substrate includes a clock 216 (FIG. 3a). The clock comprises an oscillator (not shown) with divider circuits (not shown) to provide H-drive pulses for a synchronization generator 218 (FIG. 3b), pulse clamping signals (ØCL1, ØCL2) (FIG. 3a) for the d-c restore 70 (FIG. 3b) and offset corrector 98 circuits, phase signal for S&H (ØS/H) circuit of the d-c restore circuit, field signals (ØB) (FIG. 3a) for the MDAC output S&H circuit 198, and phase signals (Ø1,Ø2) for the synchronization generator 218 (FIG. 3a). The clock 216 outputs are at the transistor to transistor logic (T2L) level 0V to -5V). Thus the H-drive signals are connected to the inverter amplifier 220 for conversion to MOS level (-5V to +5V) and connected by lead 222 to the synchronization generator 218 (FIG. 3a).

The phase clamping signals ØCL1, ØCL2 and ØS&H (FIG. 3a) are connected to the level translator with drivers 60 to make them MOS compatible. After being made MOS compatible the ØCL1 signals are used in the offset correction circuit 98. The ØCL1 is used as the ØCL3 signals for the band limiter circuit 26 and the ØCL2 signals together with the ØS&H signals are used in the d-c restore circuit 70 (FIG. 3b).

The field signals (FIG. 3a) and ∅1 and ∅2 synchronization signals are connected to an interlace generator with drivers circuit 224. The interlace generator with drivers circuit 224 outputs phase B (∅B) signals through lead 226 to the junction of a 30 stage 2∅ dynamic shift register 228 (FIG. 3b) and a one hundred twenty-two stage 2∅ dynamic shift register 230, and phase 1 and phase 2 outputs, respectively, through leads 232 and 234 to the synchronous signal producing generator 218 (FIG. 3b).

The synchronous generator 218 is connected by lead 236 to the 30 stage 2∅ dynamic shift register 228. The dynamic shift register 228 has its overflow connected to the 122 stage, 2∅ shift register 230. The 122 stage, 2∅ dynamic shift register is connected by bus 238 to multiplexer 108, and by lead K to a first terminal of OR gate 136 and by lead J to the junction of lead 138 to the VGray control switch 118 and to the second terminal of OR gate 136. OR gate 136 is connected by lead 140 to the VoREF MOSFET switch 132 (FIG. 3c).

The dynamic shift registers 228 and 230 provide: multiplex signals to the multiplexers' MOSFET switches 110 for multiplexing the video signals during the actual time for video display; J signals to the VGray MOSFET switch 118 for timing the introduction of gray level signals for framing the actual video signals; the ∅B timing pulse signals to the corrected video sample and hold circuit MOSFET switch 124 for controlling the output of the video signals during the actual time for video display; and timing pulses to the VoRef MOSFET switch 132 for synchronizing the VoRef blanking signals during the video display deadtime.

In this fashion the video is multiplexed so that after it goes through the first post amplification stage and through the multiplying digital to analog converter (which uses switched capacitor techniques) and then through the output driver the video is 525 line television video compatible and only requires the synchronization tips in order for it to be displayed on a televison monitor.

OPERATION

In operation the scanner 12 (FIG. 1) scans first the black body reference source 8 to provide reference signals to the plurality of electronic channels for partial correction of any offsets generated by each channel. During the black body scan, phase signals (∅CL1, $\overline{∅CL1}$; and ∅CL2) (FIGS. 3a and 3b) are applied, respectively, to each circuit of the plurality of offset correction circuits 98, of d-c restore circuits 70, and of band limiter circuits 26.

The ∅CL1 and $\overline{∅CL1}$ are applied simultaneously to switched 102 and 54 to switch in clamping voltages VCL1 and VCL3, respectively, to clamping capacitors (CL1 (94) and CL3 (52)) of the offset correction and band limiter circuits. The activation of the CL1 clamps sets the offset voltages associated with the threshold voltage variations in the offset correction circuits' amplifiers. While activation of the CL3 clamps remove bias offsets appearing at the band limiter circuits. Then the ∅CL2 and ∅S&H signals activate the VCL2 switch (92) and S&H switch (84), respectively to apply VCL2 to clamp CCL2 (90) and clamp VCL1 (96) to restore the d-c component to incoming black body a-c signals.

Next the scanner 12 (FIG. 1) scans the scene. During the scene scan the video signal output of the detector array 16 is d-c coupled to the plurality (1–20) channels where the bias offsets are removed form the video signals as they pass through the clamps (CCL3) 52 (FIG. 3a). The video signals are noise band limited in band limiting circuits 26 and sampled in real time by the sample and hold circuits capacitors 88 (FIG. 3b). From the S&H circuit the video signals are passed through clamps CCL2 (90) and CCL1 offset (94) to restore the d-c component to the a-c video signals and add an offset signal to compensate for the threshold loss of the amplifier 104.

The partially corrected video signals are multiplexed as picture element signals at a TV line rate. The VGray switch 118 (FIG. 3b) is activated by the "J" signals during horizontal dead time to provide a VGray signal for a gray border for the picture. The multiplexed video signals (including the gray signals) are amplified in the first stage post amplifier (36A) and applied to the multiplying digital to analog converter (MDAC) 30 where the final gain and offset corrections are made.

The corrected video signals are sampled and held in a sample and hold circuit 26 (FIG. 3c) controlled by the ∅B signals (FIG. 3b.)

The scan mirror drive is phased to the vertical field rate such that it subtends the black body just before it scans the active IR scene; this is accomplished by the ancillary electronics 20. The video signals are then amplified in the second stage post amplifier 36 and the output is television compatible video signals for display.

Although preferred embodiments of the present invention have been described in detail, it is to be understood that various changes, substitutions, and alterations can be made therein without departing from the scope of the invention as defined by the appended claims.

What is claimed is:

1. A forward looking infrared device comprising:
   a. a black body;
   b. scanning means for scanning the black body and a scene emanating infrared energy;
   c. optics for focusing the infrared energy;
   d. detector array for receiving the focused infrared energy and producing electrical signals representative of the intensity of the infrared energy impinging thereon said detector array includes a plurality of photoconductors;
   e. a signal conditioning integrated circuit consisting of a plurality of channels with each channel connected to a predetermined photoconductor and including a multiplexer for multiplexing the output of the plurality of channels;
   f. ancillary electronic means operatively connected to the signal conditioning integrated circuit, said signal conditioning integrated circuit and ancillary electronics means operative to produce working level signals representative of scene scanned; and
   g. a cooling means including a chip mounting area and a metallized output, said detector array and signal conditioning integrated circuit operatively affixed to the chip mounting area of the cooling means with the multiplexer output connected to the metallized output, whereby the detector is cooled to its operating temperature and the signal conditioning integrated circuit multiplexes the output signals of the detector array to the metallized output of said cooling means to reduce substantially the number of metallized outputs for the cooling means.

2. The forward looking infrared device according to claim 1 wherein each channel of the signal conditioning integrate circuit further includes a band limiter operatively connected to a preamplifier for limiting system noise.

3. The forward looking infrared device according to claim 2 wherein the signal conditioning integrated circuit further includes an a-c coupling means for a-c coupling the preamplifiers and band limiters.

4. The forward looking infrared device according to claim 3 wherein each channel of the signal conditioning integrated circuit further includes a d-c restore circuit operatively connected to the band limiter for restoring the d-c component to the a-c video signals.

5. The forward looking infrared device according to claim 4 wherein each channel of the signal conditioning integrated circuit further includes an offset correction circuit connected to d-c restore circuit for correcting the a-c video signals for amplifier threshold voltage offsets for multiplexing in the multiplexer.

6. The forward looking infrared device according to claim 5 wherein the signal conditioning integrated circuit further includes a post amplifying means for amplifying the video signals to a working level.

7. The forward looking infrared device according to claim 1 wherein the post amplifying means of the signal conditioning integrated circuit includes first and second post amplifier stages.

8. The forward looking infrared device according to claim 7 wherein the signal conditioning integrated circuit further includes a multiply digital to analog converter means operatively connected between the first and second post amplifier stages for final gain and offset correction of the multiplexer.

9. The forward looking infrared device according to claim 8 wherein the multiplying digital to analog converter means utilizes switched capacitor techniques.

10. The forward looking infrared device according to claim 8 further including a video signal sample and hold circuit operatively connected between the multiply digital to analog converter output and second stage post amplifier.

11. The forward looking infrared device according to claim 10 further including logic circuitry and ancillary circuitry operatively interconnected said logic circuitry included in the signal conditioning integrated circuit and operatively connected to preselected elements of the signal conditioning integrated circuitry to provide 525 line video signals for monitor display.

12. The forward looking infrared device according to claim 5 wherein the voltage offset correction circuit comprises: an offset capacitor having first and second plates, a feedback circuit switch, a clamping circuit switch and an amplifier, the first plate of the offset capacitor operatively connected to the junction of the output of the d-c restore circuit and feedback circuit switch, the second plate of the offset capacitor connected to the junction of the clamping circuit switch and input of the amplifier, said amplifier having its output connected to the junction of the feedback circuit and to the input of the multiplexer whereby at a first preselected time a clamping voltage is applied and the amplifier's output clamped in the offset capacitor for combination with the video signals.

13. The forward looking infrared device according to claim 1 wherein selected elements of the plurality of circuit elements of the signal conditioning integrated circuit are complementary metal oxide devices.

* * * * *